United States Patent Office 2,754,336
Patented July 10, 1956

2,754,336
PROCESS FOR THE INITIATION OF DEHALO-GENATION REACTIONS

Anthony J. Chernosky, Irvington, and John D. Umber, West Orange, N. J., assignors to The M. W. Kellogg Company, Jersey City, N. J., a corporation of Delaware No Drawing. Application February 16, 1953,
Serial No. 337,252

6 Claims. (Cl. 260—653)

This invention relates to the dehalogenation of a halogen-containing compound. In one of its aspects, this invention relates to the dechlorination of a halocarbon. In one of its more particular aspects, this invention relates to the dechlorination of trifluorotrichloroethane to produce chlorotrifluoroethylene.

Intermediate compounds of significant industrial importance are prepared by the dehalogenation of saturated halocarbons. For example, polytrifluorochloroethylene is prepared by the polymerization of trifluorochloroethylene, an intermediate which is prepared by the dechlorination of trifluorotrichloroethane.

It is an object of this invention to provide an improved and more economic method for the dehalogenation of halogenated hydrocarbons and halocarbons requiring a minimal number of operation steps to effect the improvement.

Another object of this invention is to provide a method of dehalogenation which can be easily controlled.

It is a still further object of this invention to provide a method of dehalogenation which can be readily started.

It is one of the particular objects of this invention to provide an easily controlled and readily effected process for the dechlorination of trifluorotrichloroethane, to produce trifluorochloroethylene.

Various other objects of the present invention will become apparent to those skilled in the art from the accompanying description and disclosure.

As herein employed, "halogenated hydrocarbons" are defined as compounds of carbon, hydrogen and halogen with any degree of saturation and containing at least three halogen atoms per molecule, said halogens being selected from the group fluorine and chlorine, which on dehalogenation produces a halo-olefin containing at least one halogen atom per molecule. "Halocarbons" are defined as halogenated hydrocarbon compounds consisting substantially exclusively of carbon and halogen with any degree of saturation. A "halo-olefin" is defined as a halocarbon or halogenated hydrocarbon with any degree of unsaturation and as regards this invention no more than one chlorine atom per atom of carbon.

Saturated halocarbons and halogenated hydrocarbons can be dehalogenated, under suitable conditions, in the presence of a solvent and a metallic dehalogenating agent to produce halo-olefins. Various solvents may be used, but in general, the solvent should be substantially completely miscible with the halocarbon or halogenated hydrocarbon that is to be halogenated and also must be capable of dissolving the metal halide which is formed in the dehalogenation reaction by the metallic dehalogenating agent. A number of metallic dehalogenating agents may be used such as, tin, magnesium, iron, zinc, and aluminum. Zinc is a preferred dehalogenating agent.

Some difficulty has been experienced in dehalogenating compounds by the process outlined above. At times, difficulty was experienced in starting up the reaction. At other times, the reaction occurred spontaneously, and with explosive violence such that the safety discs on the reaction chamber were ruptured. This behavior is believed due to the presence, on the metallic dehalogenating agent, of a coating of metal oxide which tends to inhibit the reaction. This oxide coating can be removed by adding a quantity of a metal halide such as, zinc chloride, to the reaction mixture thereby promoting the reaction.

While, by the addition of metal halide, some of the difficulties encountered in the above described process were overcome, others were created. Before it could efficiently act to promote the reaction, the metal halide had to be in solution. It was, therefore, found expedient to dissolve the halide in a solvent prior to its introduction into the reaction zone. Auxiliary equipment was needed to effect the solution of the metal halide. In addition, the number of operational steps was necessarily but, as subsequently shown by the process of this invention, needlessly increased. Also quantities of metal halide had to be purchased and stored so as to be available for use.

It has been discovered that by conducting dehalogenation reactions in the presence of a quantity of the "slurry" or bottoms obtained from previous dehalogenation reactions all of the aforementioned difficulties were overcome. This "slurry" is the bottoms of a dehalogenation reaction obtained after the removal of dehalogenated material, i. e. halo-olefin, and comprises solvent such as, alcohol, unreacted metal dehalogenating agent such as zinc, unreacted saturated halocarbon or halogenated hydrocarbon such as trifluorotrichloroethane, dissolved or otherwise entrained halo-olefin such as trifluorochloroethylene, and the high boiling products of the dehalogenation reaction. It was additionally, although surprisingly, discovered that this dehalogenation process was more readily initiated and more easily controlled by use of bottoms slurry, in accordance with this invention, than processes promoted by other means.

It was further discovered that, in addition to the above enumerated improvements, it was now possible to conduct the dehalogenation reaction with a considerably reduced quantity of metal dehalogenating agent. In the dehalogenation of trifluorotrichloroethane with metallic zinc, for example, the reaction was previously conducted with up to 100% excess zinc and usually with at least 40 to 50 percent excess. Apparently, by the process of this invention, the required excess of zinc is reduced to between about 1 and about 10 percent, preferably between about 3 and about 5 percent. The savings apparently made possible by this invention are, therefore, obvious. Moreover, by using lower percentages of zinc, less solid material accumulates at the bottom of the reaction zone thereby lessening or wholly eliminating the danger of clogging outlet or drain valves which are located at the bottom of the reaction zone. These valves are used to remove bottoms or slurry from the dehalogenation zone and, since they must be kept in operating condition, have to be cleaned if they become clogged. This cleaning operation is tedious and expensive as it involves chipping away, by hand, the compressed mass of metal with a chisel. The process of this invention, conducted with lower concentrations of dehalogenating agent, eliminates this accumulation of solid material thereby saving considerable time in the overhaul of equipment and in the production of materials.

At times, it may be desirable to clean out the reaction zone. Any convenient method may be employed such as flushing with water or steam or by scraping and polishing the walls of the equipment with a wire brush, chisel, etc. The addition of a portion of the slurry to the cleaned reaction zone has been found to be of significant value in starting up the reaction. Here the slurry is preferably added prior to the addition of the other reactants, but may be added simultaneously with or subsequent to the addition of the other reactants.

The process of this invention is applicable to either continuous or batch type operations. In a continuous operation a portion of the bottoms or "slurry" is introduced into the dehalogenation zone to initiate the reaction and is admixed with the material to be dehalogenated, the metal dehalogenating agent and the solvent either prior to, simultaneously with or subsequent to the addition of one or more of the above indicated components of the process, preferably prior to the addition of the material to be dehalogenated, by any convenient means. In a bomb or batch type of operation, the bottoms slurry is introduced either prior to, simultaneously with or subsequent to the addition of one or more of the components of the process, and preferably prior to the addition of the material to be dehalogenated.

For a better understanding of our invention, its use will be described in terms of the dechlorination of trifluorotrichloroethane to produce trifluorochloroethylene. It is to be understood and will be clearly apparent to those skilled in the art that the process of this invention may be applied equally well to the production of any halo-olefin. For example, trichloroethane may be dehalogenated to vinyl chloride, dichlorofluoroethane to vinyl fluoride, dichlorodifluoroethane to difluoroethylene and dichlorotetrafluoroethane to tetrafluoroethylene.

Trichlorotrifluoroethane of the 1,2,2,chloro structure, which may be obtained on the open market as Freon 113, is introduced into a suitable dehalogenation chamber. A dechlorinating agent, such as metallic zinc dust, is also introduced into the chamber. Fresh solvent for dissolving the metal halide formed in the dehalogenator is also continuously or intermittently introduced into the dehalogenator. In this discussion the solvent used is methyl alcohol. The amount of metal dechlorinating agent introduced into the dehalogenator is at least that amount necessary for the removal of two halogen atoms from the halocarbon or halogenated hydrocarbon. Preferably, an excess dechlorinating agent is used in effecting the dechlorination reaction and the excess may be as much as 10% or more. It is desirable to have an amount of solvent equivalent in weight to the halocarbon or the halogenated hydrocarbon but the amount may vary depending upon the reaction conditions. Quantities are generally less for superatmospheric than for atmospheric pressures. The slurry is added to the above reaction chamber in quantities between about 0.01% and about 10%, preferably in quantities between about 0.1 and about 3%. The slurry may be added separately or in admixture with the solvent or with the mateiral which is to be dehalogenated.

For the dechlorination of trifluorotrichloroethane to trifluorochloroethylene pressures between about atmospheric and about 400 pounds per square inch gauge may be employed. Preferably a pressure between about 100 and about 180 pounds per square inch gauge and a particularly suitable pressure of about 140 pounds per square inch gauge. In the preferred form of the invention, the pressure should be sufficient to maintain the trifluoro-trichloroethane in liquid phase and, at the same time, permit vaporization of the trifluorochloroethylene from the liquid phase in the dehalogenator. A suitable temperature for the dehalogenation is between about 0° C. and about 200° C. It is preferred to use a temperature between about 60 and about 110° C. usually about 100° C. At higher temperature the rate of reaction is increased which in most instances is desirable. However, excessive temperatures cause undesirable side reactions. It should also be pointed out that, by the process of this invention, operations may successfully be conducted at a lower temperature in the above range.

Suitable solvents for the dehalogenation step comprise methyl, ethyl, n-propyl, n-butyl alcohols; dioxane, glycerol, butyl-Carbitol and the Cellosolves. Other known solvents complying with the general requirements may be used, if desired without departing from the scope of this invention. The preferred solvents are methyl and ethyl alcohol.

Since the temperatures and pressure conditions which are maintained in the dehalogenator are such that the halo-olefin formed therein as the desired product is vaporized the olefin passes upward together with entrained and vaporized saturated halocarbons or halogenated hydrocarbons and solvent into a rectification column wherein entrained contaminants are condensed and returned to the reactor. The halo-olefin is collected and subsequently purified.

The following example is provided by way of illustration and should not be considered as unnecessarily limiting the invention.

754 pounds of methanol, 400 pounds of zinc powder and 1 gallon of bottoms slurry obtained from a previous dechlorination of trifluorotrichloroethane were added to an autoclave. The autoclave was maintained at a temperature between about 93° C. and about 105° C. and at a pressure of about 140 pounds per square inch gauge. 1116 pounds of Freon 113 (trifluorotrichloroethane) was introduced into the autoclave at a rate of about 300 pounds per hour. The reaction started immediately and continued smoothly to completion. The produced trifluorochloroethylene was collected and purified.

Having described our invention, we claim:

1. In a process for dechlorinating a fluorochloroethane with a metal dechlorinating agent and an alcohol in a dechlorination zone to produce the corresponding fluorine-containing ethylene, the improvement in starting up said process which comprises introducing a mixture of a metal dechlorinating agent, an alcohol and a portion of the bottoms from a previous dechlorination reaction wherein a fluorine-containing ethylene was produced by dechlorinating a fluorochloroethane with a corresponding metal dechlorinating agent and an alcohol to said dechlorination zone and then adding said fluorochloroethane to said zone.

2. In a process for dechlorinating a fluorochloroethane with metallic zinc and an alcohol in a dehalogenation zone to produce the corresponding fluorine-containing ethylene, the improvement in starting up said process which comprises introducing a mixture of metallic zinc, an alcohol and a portion of the bottoms from a previous dechlorination reaction wherein a fluorine-containing ethylene was produced by dechlorinating a fluorochloroethane with metallic zinc and an alcohol to said dechlorination zone and then adding said fluorochloroethane to said zone.

3. In a process for dechlorinating trifluorotrichloroethane with metallic zinc and an alcohol in a dehalogenation zone to produce trifluorochloroethylene, the improvement in starting up said process which comprises introducing a mixture of metallic zinc, an alcohol and between 0.01 and 10 per cent based on the weight of metallic zinc of a portion of the bottoms from a previous dechlorination reaction wherein trifluorochloroethylene was produced by dechlorinating trifluorotrichloroethane with metallic zinc and an alcohol to said dechlorination zone, then adding said trifluorotrichloroethane to said zone and maintaining said zone and contents at a temperature between about 0° C. and about 200° C. and at a pressure between atmospheric and about 400 pounds per square inch gage.

4. In a process for dechlorinating dichlorofluoroethane with metallic zinc and an alcohol in a dehalogenation zone to produce vinyl fluoride, the improvement in starting up said process which comprises introducing a mixture of metallic zinc, an alcohol and between 0.01 and 10 per cent based on the weight of metallic zinc of a portion of the bottoms from a previous dechlorination reaction wherein vinyl fluoride was produced by dechlorinating dichlorofluoroethane with metallic zinc and an alcohol to said dechlorination zone, then adding said dichlorofluoroethane to said zone and maintaining said zone and contents at a temperature between about 0° C. and about 200° C. and at a pressure between atmospheric and about 400 pounds per square inch gage.

5. In a process for dechlorinating dichlorodifluoroethane with metallic zinc and an alcohol in a dehalogenation zone to produce difluoroethylene, the improvement in starting up said process which comprises introducing a mixture of metallic zinc, an alcohol and between 0.01 and 10 per cent based on the weight of metallic zinc of a portion of the bottoms from a previous dechlorination reaction wherein difluoroethylene was produced by dechlorinating dichlorodifluoroethane with metallic zinc and an alcohol to said dechlorination zone, then adding said dichlorodifluoroethane to said zone and maintaining said zone and contents at a temperature between about 0° C. and about 200° C. and at a pressure between atmospheric and about 400 pounds per square inch gage.

6. In a process for dechlorinating dichlorotetrafluoroethane with metallic zinc and an alcohol in a dehalogenation zone to produce tetrafluoroethylene, the improvement in starting up said process which comprises introducing a mixture of metallic zinc, an alcohol and between 0.01 and 10 per cent based on the weight of metallic zinc of a portion of the bottoms from a previous dechlorination reaction wherein tetrafluoroethylene was produced by dechlorinating dichlorotetrafluoroethane with metallic zinc and an alcohol to said dechlorination zone, then adding said dichlorotetrafluoroethane to said zone and maintaining said zone and contents at a temperature between about 0° C. and about 200° C. and at a pressure between atmospheric and about 400 pounds per square inch gage.

References Cited in the file of this patent

UNITED STATES PATENTS

| | | |
|---|---|---|
| 2,344,061 | Renoll | Mar. 14, 1944 |
| 2,590,433 | Blum | Mar. 25, 1952 |
| 2,635,121 | Smith et al. | Apr. 14, 1953 |